United States Patent [19]

Sims, Jr.

[11] Patent Number: 4,737,874
[45] Date of Patent: Apr. 12, 1988

[54] MAGNETIC HEAD ASSEMBLY WITH DECREASED SETTING TIME OF ADHESIVES

[75] Inventor: Dewey M. Sims, Jr., Wayne, Mich.

[73] Assignee: Northern Telecom Limited, Montreal, Canada

[21] Appl. No.: 694,410

[22] Filed: Jan. 24, 1985

[51] Int. Cl.$^4$ .......................... G11B 5/10; G11B 5/11
[52] U.S. Cl. ...................... 360/129; 360/109
[58] Field of Search ........... 360/104, 128–129, 360/109; 29/603

[56] References Cited

U.S. PATENT DOCUMENTS 3,548,393 12/1970 Montel .............................. 360/129
4,405,961 9/1983 Chow et al. ....................... 360/128

FOREIGN PATENT DOCUMENTS 0133616 8/1983 Japan .................................. 29/603
1119423 7/1968 United Kingdom ............... 360/109

OTHER PUBLICATIONS

Fazzio et al., "Read and Write Modular Head Assembly", IBM T.D.B., Oct. 1979, vol. 22, No. 5, p. 2087.

Primary Examiner—Stuart N. Hecker
Assistant Examiner—David J. Severin
Attorney, Agent, or Firm—Schwartz, Jeffery, Schwaab, Mack, Blumenthal & Evans

[57] ABSTRACT

A method for decreasing the time taken for an adhesive to set is disclosed. In a small gap (e.g. 0.005 inches or less) an adhesive such as LOCTITE 420 sets in approximately two seconds. If the gap is larger than this, the set time can be as long as fifteen minutes or more. The present invention is directed to the use of a piece of corrugated material in the gap so as to provide small gaps (i.e. 0.005 inches or less) in which the adhesive can set in a short time period (of a few seconds duration). A specific application to a magnetic read/write head is disclosed.

7 Claims, 1 Drawing Sheet

MAGNETIC HEAD ASSEMBLY WITH DECREASED SETTING TIME OF ADHESIVES

BACKGROUND OF THE INVENTION

1. Field of the Invention

The present invention relates generally to decreasing the setting time for an adhesive and more particularly to its application in the production of a magnetic read/write head assembly for tape drives and the like.

2. Related Art

In an assembly line manufacturing process for magnetic read/write heads, the magnetic head proper is mounted on head-carrier by insertion. The plastic head-carrier is held with a preload force to the frame of the tape drive, then the magnetic head proper is inserted and the azimuth angle is adjusted to within ±3 seconds of arc before an adhesive is applied to lock the magnetic head in the head-carrier. For this reason, it is necessary to have the head-carrier wider than the magnetic head proper by 0.02 inches on either side. Such a large gap, however, would cause the locking adhesive to take too long to set and cure, thereby slowing the assembly line production considerably.

OBJECTS AND SUMMARY OF THE INVENTION

The present invention solves this problem by simply providing two strips of corrugated metal, one in each of the two 0.02 inch gaps between the head-carrier sides and the side surfaces of the magnetic head proper. This permits azimuth adjustment prior to adhesive application and, by using a suitable adhesive, fast cure.

Another advantage is less potential for warpage. Adhesives shrink as they cure. If less adhesive can be used, that means less volumetric shrinkage and thus potential for warpage. Because the corrugated strips occupy some of the space that would otherwise be occupied by an adhesive this potential for warpage, caused by the adhesive shrinking, is reduced.

Accordingly, the present invention provides a magnetic head assembly for tape drives and the like, comprising: a magnetic read/write head; a house having two opposite inside walls, one on either side of the magnetic read/write head; corrugated strips between each of the two opposite walls and the adjacent surface of the magnetic read/write head; and said corrugated strips bonded to the inside walls of the housing and to the adjacent surfaces of the magnetic read/write head by means of a fast curing adhesive during assembly.

BRIEF DESCRIPTION OF THE DRAWINGS

The preferred embodiment of the present invention will now be described in conjunction with the attached drawings, in which.

DETAILED DESCRIPTION OF THE INVENTION

Figure 1:
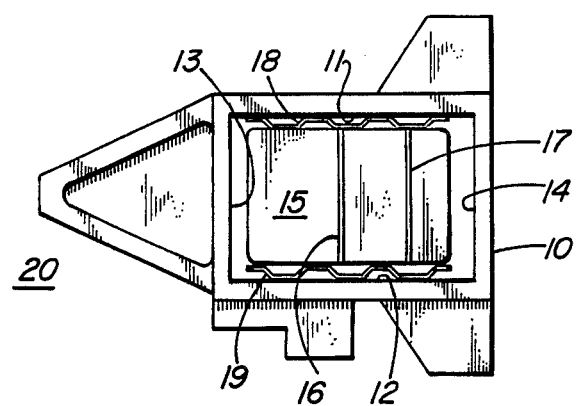
FIG. 1 is a plan view of the magnetic head assembly according to the present invention.

Referring now to magnetic head assembly 20 depicted in FIG. 1 of the drawings, a housing 10 of molded plastic has four inside walls 11, 12, 13 and 14. The inside walls 11 and 12 being the critical walls as far as the adjustment of the azimuth of a magnetic read/write head 15 retained within the inside walls 11, 12, 13 and 14 of the housing 10. The azimuth angle of the magnetic read/write head 15, which angle determines the orientation of the read and write apertures 16 and 17 relative to the direction of travel of the magnetic recording tape (not shown).

Ideally, the read and write apertures 16 and 17 should be exactly perpendicular to the travel direction of the magnetic tape, but practically it is required to maintain an azimuth angle within a tolerance of ±3 seconds of an arc. Accordingly, the azimuth of the magnetic read/write head must be adjusted within the housing 10, which itself is mounted in the head mounting fixture of the tape drive with a certain preload force, prior to its permanent gluing to the housing 10.

The azimuth of the housing 10 itself is not critical and there is enough space between the magnetic read/write head 15 and the inside walls 11 and 12 to permit slight rotation of the magnetic head 15 to within the ±3 seconds of an arc tolerance. Two corrugated brass strips 18 and 19 are placed between the sides of the magnetic head 15 and the inside walls 11 and 12, respectively. Once the magnetic head 15, i.e. the read and write apertures 16 and 17, has the correct orientation, the adhesive is applied to the spaces between the magnetic head 15 and the inside walls 11 and 12. The preferred adhesive is that sold under the trademark LOCTITE 420. It is very fast setting in gaps smaller than 0.005 inches, and accordingly sets within approximately two seconds in the small gaps between the peaks and troughs of the corrugated brass strips 18 and 19 and the respective contiguous surfaces of the magnetic head 15 and the inside walls 11 and 12. Without the brass strips 18 and 19 the large gaps between the inside walls 11 and 12 and the magnetic head 15 of approximately 0.02 inches would cause a curing time of the preferred adhesive to be in the order of fifteen minutes, an inordinately long time for assembly line processes typical of such production.

Figure 2:
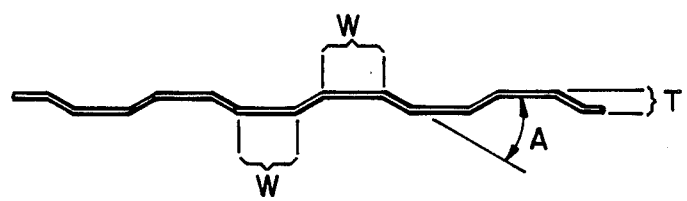
FIG. 2 is a side elevation of the corrugated metal strip shown in the assembly of FIG. 1 prior to insertion in the assembly.

The corrugated brass strips 18 and 19 are similar to that shown in side elevation in FIG. 2. The troughs and peaks are approximately 0.08 inches wide, while the angle A is approximately 30 degrees. The corrugation thickness T of the strip is approximatey 0.03 inches, its length is approximately 0.9 inches and its width is approximately 0.35 inches. These dimensions may, of course, be varied to suit the application.

It is of note that before the adhesive is applied the low yield strength brass strips 18 and 19 are easily compressed; angle A decreases and zones W move further away from each other flexible enough to permit the slight azimuth adjustment required without exceeding the preload force with which the housing 10 is attached to the head mounting fixture of the tape drive. However, once the adhesive is applied it laminates the surfaces of the brass strips 18 and 19 and cures very fast to render the strips sufficiently rigid and inflexible. The effective beam length of the brass strips 18 and 19 significantly decreases as the adhesive anchors the zones W of the strip to both the head 15 and housing 10.

It is important to observe that the normal corrugation thickness of the strips 18 and 19 is larger than the spacing between the inside walls 11 and 12 and the respective adjacent surface of the magnetic head 15; the normal corrugation thickness of the strips 18 and 19 being 0.03 inches, while the distance between inside walls and magnetic head surface is 0.02 inches.

It should also be noted that, depending upon the application, the adhesive may be applied first and then the strips inserted.

What is claimed is:

1. A magnetic head assembly for tape drives and the like, comprising:
   a magnetic read/write head;
   a housing having two opposite inside walls, one on each side of the magnetic read/write head;
   corrugated strips between each of the two opposite walls and the adjacent surface of the magnetic read/write head; and
   said corrugated strips having interstices formed thereon and being bonded to the inside walls of the housing and to said adjacent surfaces of the magnetic read/write head by means of a fast curing adhesive during assembly such that curing of the adhesive occurs in the interstices between said walls and said corrugated strips.

2. The magnetic head assembly as defined in claim 1, wherein said corrugated strips have a normal corrugation thickness slightly larger than the distance between each of said two opposite walls and the adjacent surface of the read/write head.

3. The magnetic head assembly as defined in claim 1, wherein said corrugated strips are metal.

4. The magnetic head assembly as defined in claim 3, said fast curing adhesive being applied during assembly after said magnetic read/write head is in a predetermined azimuth orientation within a predetermined tolerance.

5. The magnetic head assembly as defined in claim 3, wherein said corrugated strips have a normal corrugation thickness slightly larger than the distance between each of said two opposite walls and the adjacent surface of the read/write head.

6. The magnetic head assembly as defined in claim 3, wherein said corrugated strips are brass strips.

7. The magnetic head assembly as defined in claim 6, wherein said corrugated strips have a normal corrugation thickness slightly larger than the distance between each of said two opposite walls and the adjacent surface of the read/write head.

* * * * *